(12) United States Patent
Matsumura et al.

(10) Patent No.: US 12,104,063 B2
(45) Date of Patent: Oct. 1, 2024

(54) SOLID SOLUTION OF QUINACRIDONE AND INK COMPOSITION CONTAINING SAME

(71) Applicant: DIC Corporation, Tokyo (JP)

(72) Inventors: Kentarou Matsumura, Kamisu (JP); Yukiko Higuchi, Kamisu (JP); Hidehiro Ootake, Kamisu (JP)

(73) Assignee: DIC CORPORATION, Tokyo (JP)

( * ) Notice: Subject to any disclaimer, the term of this patent is extended or adjusted under 35 U.S.C. 154(b) by 809 days.

(21) Appl. No.: 16/978,057

(22) PCT Filed: Mar. 28, 2019

(86) PCT No.: PCT/JP2019/013575
§ 371 (c)(1),
(2) Date: Sep. 3, 2020

(87) PCT Pub. No.: WO2019/202939
PCT Pub. Date: Oct. 24, 2019

(65) Prior Publication Data
US 2021/0040327 A1 Feb. 11, 2021

(30) Foreign Application Priority Data

Apr. 17, 2018 (JP) .................................. 2018-079077

(51) Int. Cl.
C09B 48/00 (2006.01)
C09B 67/22 (2006.01)
C09D 11/037 (2014.01)
C09D 11/322 (2014.01)

(52) U.S. Cl.
CPC .......... C09B 48/00 (2013.01); C09B 67/0033 (2013.01); C09D 11/037 (2013.01); C09D 11/322 (2013.01)

(58) Field of Classification Search
CPC . C09B 48/00; C09B 67/0033; C09B 67/0027; C09B 67/0036; C09B 67/0092; C09D 11/037; C09D 11/322
See application file for complete search history.

(56) References Cited

U.S. PATENT DOCUMENTS

| 3,160,510 | A | * | 12/1964 | Ehrich | C09B 48/00 546/56 |
| 5,989,333 | A | * | 11/1999 | Urban | C09B 67/0036 106/31.77 |
| 6,251,553 | B1 | | 6/2001 | Baur et al. | |
| 6,284,890 | B1 | | 9/2001 | Mitina | |
| 6,312,512 | B1 | | 11/2001 | Urban et al. | |
| 2013/0029265 | A1 | * | 1/2013 | Plueg | C09B 67/0036 106/31.77 |
| 2016/0160050 | A1 | * | 6/2016 | Kido | C09D 17/00 524/90 |
| 2016/0280924 | A1 | | 9/2016 | Sugiyama et al. | |
| 2017/0342286 | A1 | * | 11/2017 | Yanagawa | C09D 11/326 |
| 2018/0037741 | A1 | * | 2/2018 | Saitou | C09B 67/0066 |

FOREIGN PATENT DOCUMENTS

| JP | 10-219166 A | 8/1998 |
| JP | 2000-248189 A | 9/2000 |
| JP | 2000-281930 A | 10/2000 |
| JP | 2001-335577 A | 12/2001 |
| JP | 2002-146224 A | 5/2002 |
| JP | 2006-96927 A | 4/2006 |
| JP | 2009275125 A * | 11/2009 |
| JP | 2013-528668 A | 7/2013 |
| JP | 2013-223958 A | 10/2013 |
| WO | WO-2016208292 A1 * | 12/2016 ............. C09B 48/00 |

OTHER PUBLICATIONS

English Machine Translation of JP2009275125A ("Machine_Translation_Doi_JP_2009275125_A") (Year: 2009).*
Extended (Supplementary) European Search Report dated Dec. 20, 2021, issued in counterpart EP application No. 19788308.5. (4 pages).
International Search Report dated Jul. 2, 2019, issued in counterpart International Application No. PCT/JP2019/013575 (2 pages).
Notice of Reasons for Refusal dated Apr. 14, 2020, issued in counterpart JP Patent Application No. 2020-506360, w/ English translation (12 pages).

* cited by examiner

Primary Examiner — Jennifer A Smith
Assistant Examiner — Jeffrey Eugene Barzach
(74) Attorney, Agent, or Firm — WHDA, LLP

(57) ABSTRACT

An object to be achieved by the present, invention is to provide a quinacridone pigment having hue that is yellowish and clear and having excellent storage stability, wherein the quinacridone pigment can be advantageously used in an ink-jet ink and the like. Provided is a quinacridone solid solution pigment comprising at least C. I. Pigment Violet 19 and C. I. Pigment Red 122, wherein the ratio of a diffraction peak intensity at a diffraction angle 2θ of 14.8±0.2° to a diffraction peak intensity at a diffraction angle 2θ of 11.9±0.2° is 1.20 or less, as measured by X-ray diffractometry with respect to the quinacridone solid solution pigment.

7 Claims, No Drawings

SOLID SOLUTION OF QUINACRIDONE AND INK COMPOSITION CONTAINING SAME

TECHNICAL FIELD

The present invention relates to a quinacridone solid solution which can be used in a wide variety of applications including a coating composition, a toner, and a printing ink (for ink-jet and the like), and an ink composition containing the same.

BACKGROUND ART

Quinacridone pigments are used in various applications including a coating composition, a toner, and a printing ink (for ink-jet and the like), and proposals of those having new hue according to the social needs and the use of the pigments are always desired. For example, with respect to the pigment for use in a magenta ink for ink-jet recording, studies have been made on C. I. Pigment Violet 19 and C. I. Pigment Red 122, which have excellent color development properties, high chroma, and high lightness, and a mixture or a solid solution thereof, but, in recent years, a pigment having more yellowish hue is demanded. In the improvement of hue, promising pigments are selected from a great number of possibly suitable pigments, and there are numerous combinations of the selected pigments, which can be considered from mixing them and the like, and further the obtained pigment needs to maintain at least the conventional color properties, and such studies are made by trial and error.

As literature that discloses a construction closely related to that of the present invention, there are patent literature (JP-A-2000-281930) that discloses a gamma-phase quinacridone mixed crystal pigment which contains 82.5 to 99% by weight of an unsubstituted γ-phase quinacridone and 1 to 17.5% by weight of one or two or more 2,9- and/or 3,10-substituted quinacridones, and patent literature (JP-A-2000-248189) that discloses a method for producing a quinacridone, which contains the ring closure step using at least one 2,5-diarylamino-3,6-dihydroterephthalic acid as a starting material, the sulfonation step for the reactant, and the recovery step for the obtained quinacridone pigment.

A solid solution (which is also called a mixed crystal) means a phase in which the atoms at the lattice points of a crystal phase are totally irregularly replaced by atoms of a different type, or a phase in which atoms of a different type are introduced into a crystal phase so as to be statistically distributed in the space of lattice, namely means a mixed phase considered to have dissolved in a crystal phase another substance. The crystal phase is limited to a uniform phase such that two phases do not coexist.

The solid solution frequently indicates physical or optical properties different from those of a simple mixture.

Further, the presence of a solid solution can be found by, for example, the measurement, of a crystal X-ray diffraction spectrum from a result that a new peak appears at a diffraction angle at which no peak is present in the case of a simple mixture, or that conversely, a peak at a specific diffraction angle, at which the peak is present in the case of a simple mixture, disappears. C. I. Pigment Violet 19, C. I. Pigment Red 122, C. I. Pigment Red 202, and C. I. Pigment Red 209, which are a quinacridone pigment, individually form one or a plurality of crystal structures (for example, C. I. Pigment Violet 19 forms crystal structures of α, β, and γ types), and further form solid solutions having these pigments as constituents, and having crystal structures different from the respective crystal structures of the pigments.

In addition, when forming these solid solutions, there is a composition of the components, which enables formation of the solid solution, and the same solid solution cannot be formed from the constituents in an arbitrary ratio.

However, when the quinacridone solid solution which has already been reported is used, it is difficult to obtain crystallites having a fine and uniform size or primary particles having a fine and uniform size or shape, and, when such a quinacridone solid solution is used as an ink, an ink having intended hue and color development and having excellent, storage stability cannot be obtained. Particularly, with respect to the quinacridone magenta pigment for use in an ink-jet ink, there is desired a quinacridone pigment from which an ink having hue that is yellowish and clear and having excellent storage stability can be obtained, but a solid solution of C. I. Pigment Violet 19 and C. I. Pigment Red 202, which can achieve hue that is yellowish, is disadvantageous in that the primary particles excessively grow, and thus has the following problems. For obtaining fine primary particles which can be used in an ink-jet ink, it is necessary to use a solvent salt milling method that requires a great amount of energy. Relatively small primary particles can be obtained from a solid solution of C. I. Pigment Violet 19 and C. I. Pigment Red 122 without using a solvent salt milling method, but the resultant ink is disadvantageous in that hue is bluish, and in that the size and shape of the primary particles are not uniform, and thus has poor storage stability when used as an ink-jet ink. Further, in any of the solid solutions, it is difficult to specify the ratio of the components constituting the solid solution, and the relationship between the composition of the solid solution and the property value of hue, storage stability, or the like is not clear.

Thus, with respect to the quinacridone pigment, a further improvement is desired.

CITATION LIST

Patent Literature

PTL 1: JP-A-2000-281930
PTL 2: JP-A-2000-243189

DISCLOSURE OF INVENTION

Technical Problem

In view of the above, an object to be achieved by the present, invention is to provide a quinacridone pigment having hue that is yellowish and clear and having excellent storage stability when used in an ink-jet ink and the like.

Solution to Problem

The present inventors have conducted extensive and intensive studies with a view toward solving the above-mentioned problems. As a result, it has been found that the problems can be solved by using a specific solid solution pigment comprising C. I. Pigment Violet 19 and C. I. Pigment Red 122, and the present invention has been completed.

Specifically, the present invention is directed to:
Item 1. A quinacridone solid solution pigment comprising C. I. Pigment Violet 19 and C. I. Pigment Red 122, wherein the ratio of a diffraction peak intensity at a diffraction angle 2θ of 14.8±0.2° to a diffraction peak intensity at a diffraction angle 2θ of 11.9±0.2° is 1.20 or less, as measured by X-ray diffractometry with respect to the quinacridone solid solution pigment (hereinafter, frequently referred to as "the quinacridone solid solution pigment of the invention").

Item 2. The quinacridone solid solution pigment according to Item 1 above, wherein the thickness of a crystallite is from 20 to 40 nm, as determined by X-ray diffractometry from a half band width of the maximum diffraction peak appearing at a diffraction angle 2θ of 13 to 14°.

Item 3. A quinacridone pigment having the quinacridone solid solution pigment according to Item 1 or 2 above, which further contains a quinacridone pigment derivative.

Item 4. The quinacridone pigment according to Item 3 above, wherein the amount of the quinacridone pigment derivative contained is from 1 to 10 parts by mass.

Item 5. An ink composition comprising at least the quinacridone solid solution pigment according to Item 1 or 2 above, and a quinacridone pigment derivative.

Item 6. The ink composition according to Item 5 above, which contains from 1 to 10 parts by mass of the quinacridone pigment derivative, relative to 100 parts by mass of the quinacridone solid solution pigment.

Advantageous Effects of Invention

The quinacridone solid solution pigment of the invention provides a quinacridone pigment having hue that is yellowish and clear and having excellent storage stability when used in an ink-jet ink and the like.

<Effects Obtained by Solving the Problems are Described>

DESCRIPTION OF EMBODIMENTS

Hereinbelow, the present, invention will be described in detail.

<Description of the Quinacridone Solid Solution Pigment>

In the invention, the quinacridone solid solution indicates a quinacridone solid solution which contains C. I. Pigment Violet 19 and C. I. Pigment Red 122 as essential components, more specifically, a quinacridone solid solution in which a mixed phase considered to have C. I. Pigment Red 122 dissolved in the crystal phase of C. I. Pigment Violet 19 is formed. Accordingly, this solid solution has an inherent peak of the diffraction angle as measured by crystal X-ray diffraction, which peak is not present in any of the single crystal of C. I. Pigment Violet 19 and the single crystal of C. I. Pigment Red 122. Therefore, it is possible to easily check by crystal X-ray diffraction whether the quinacridone pigment is a solid solution or merely a mixture of the single crystals.

The quinacridone solid solution pigment of the invention is a quinacridone solid solution pigment comprising C. I. Pigment Violet 19 and C. I. Pigment Red 122, and, in X-ray diffractometry made with respect to the quinacridone solid solution pigment, a diffraction peak appearing at a diffraction angle 2θ of 11.9±0.2° is ascribed to the solid solution of C. I. Pigment Violet 19 and C. I. Pigment Red 122, and a diffraction peak appearing at a diffraction angle 2θ of 14.3±0.2° is ascribed to C. I. Pigment Red 122 which forms the solid solution. Therefore, the ratio of a diffraction peak intensity at a diffraction angle 2θ of 14.3±0.2° to a diffraction peak intensity at a diffraction angle 2θ of 11.9±0.2° indicates the ratio of C. I. Pigment Red 122 in the solid solution. In the solid solution of C. I. Pigment Violet 19 and C. I. Pigment Red 122, it is considered that the individual components form crystallites in the solid solution while suppressing excessive growth of the crystallites of the components. In this case, for obtaining primary particles having a more uniform size and shape, it is necessary that the crystallites be in a uniform state, and the ratio of C. I. Pigment Violet 19 and C. I. Pigment Red 122 is an important factor in meeting such a requirement. When the diffraction peak intensity ratio is 1.20 or less, the above-mentioned excellent effects are exhibited.

Further, in the quinacridone solid solution pigment of the invention, from the viewpoint of achieving more excellent, storage stability, considering a combination with the above-mentioned "ratio of diffraction peak intensity", it is preferred that the thickness of a crystallite is 20 to 40 nm, as determined by X-ray diffractometry from a half band width of the maximum diffraction peak appearing at a diffraction angle 2θ of 13 to 14°. A crystallite is a structure of the smallest unit, which forms primary particles, and, when the crystallite is excessively small, the formed primary particles are likely to be small. Even when the primary particles are caused to grow to become larger by appropriately controlling the after-treatment conditions, the resultant primary particles are unstable so that excessively small particles are formed in the dispersion step which is conducted when preparing an ink or the like. In any case, when an ink or the like is prepared from such particles, a large amount of very small particles are inevitably contained in the prepared ink or the like, and therefore the very small particles suffer re-aggregation when being stored, so that the ink has poor storage stability. Thus, for stably dispersing the particles in an ink or the like, it is necessary to control the thickness of a crystallite.

Further, the quinacridone solid solution pigment of the invention can further contain a quinacridone pigment derivative. By using a quinacridone pigment derivative in combination with the quinacridone solid solution pigment, it is possible to achieve higher storage stability. The presence of the quinacridone pigment derivative in the quinacridone pigment can be found by, for example, an infrared absorption spectrum (IR) or a mass spectrum (MS).

With respect to the quinacridone pigment derivative used in the invention, there can be used any of those which are conventionally known and commonly used. Examples thereof include quinacridone pigment derivatives obtained by substituting the skeleton of C. I. Pigment Violet 19, C. I. Pigment Red 202, C. I. Pigment Red 209, or C. I. Pigment Red 122 with one or two or more of a sulfonic acid, residue and a metal salt thereof, a dialkylaminoalkylaminosulfamoyl residue, a phthalimidomethyl residue, and a dialkylaminoalkyl residue, such quinacridonesulfonic acid, dimethylaminopropylaminosulfamoylquinacridone, pyrazolyl-methylquinabridone, dimethylaminopropylquinacridonemonosulfonamide, dimethylaminopropylquinacridonedisulfonamide, and 2-phthalimidomethyl and dimethylaminomethylquinacridone.

Of these, from the viewpoint of achieving more excellent storage stability, preferred are sulfonic acid or a metal salt thereof, or dimethylaminopropylaminosulfamoyl derivatives.

In the invention, when a quinacridone pigment derivative is used, it is preferred that, relative to 100 parts by mass of the quinacridone solid solution pigment, 1 to 10 parts by mass of the quinacridone pigment derivative is used.

Further, a pigment derivative other than the above-mentioned derivatives may be further used. With respect to the structure of the pigment derivative, there can be used not only the skeletons of C. I. Pigment Violet 19, C. I. Pigment Red 202, C. I. Pigment Red 209, and C. I. Pigment Red 122, but also skeletons of condensed polycyclic pigments, such as C. I. Pigment Violet 23, C. I. Pigment Blue 15 (copper phthalocyanine), C. I. Pigment Red 177, and C. I. Pigment Red 254, 255.

<Production Method>

An example of the method for obtaining the quinacridone solid solution pigment of the invention is shown below, but the example of the method should not be construed as limiting the scope of the invention.

The crude quinacridone solid solution pigment used in the invention can be produced by a conventionally known method. For example, there can be mentioned a method in which 2,5-dianilinoterephthalic acid (raw material for C. I. Pigment Violet 19) and 2,5-di-toluidinoterephthalic acid (raw material for C. I. Pigment Red 122), which are raw materials for the crude quinacridone solid solution pigment, are subjected to cyclodehydration in polyphosphoric acid, and the resultant reaction mixture is poured into water, and then the deposit, is subjected to filtration and washing with water. The mass ratio of 2,5-dianilinoterephthalic acid and 2,5-di-toluidinoterephthalic acid is 80/20 to 20/80, and is preferably 70/30 to 60/40 in view of forming a more uniform crystallite.

The quinacridone solid solution pigment of the invention can be produced by heating the above-obtained crude quinacridone solid solution pigment (which is frequently referred to as "quinacridone solid solution crude pigment" in the Examples below, and these terms have the same meaning) in a liquid medium in an amount much larger than the crude pigment.

With respect to the liquid medium used in the production, one which does not dissolve the crude quinacridone solid solution pigment is selected. Further, from the viewpoint of stably conducting the crystal control, the liquid medium preferably contains a water-soluble organic solvent as a main component.

Examples of such water-soluble organic solvents include dimethylformamide, dimethyl sulfoxide, N-methylpyrrolidone, ethanol, isopropyl alcohol, propanol, isobutanol, and ethylene glycol, but, taking into consideration the heating temperature during the production and the cost and safety of the production, it is preferred to use dimethylformamide, isopropyl alcohol, or isobutanol. With respect to the amount of the water-soluble organic solvent used, there is no particular limitation, but the amount of the water-soluble organic solvent is in the range corresponding to the amount 0.1 to 20 times the weight of the crude quinacridone solid solution pigment, and may be larger than the amount in this range, but, from the viewpoint of avoiding an increase of the cost for recovery of the solvent, it is preferred that the amount of the water-soluble organic solvent is appropriately set at an amount within the above-mentioned range.

Among the liquid media containing a water-soluble organic solvent as a main component, a liquid medium containing water and a water-soluble organic solvent is preferably used. In this case, when the liquid medium containing water and a water-soluble organic solvent has a water content of 20 to 80%, the crude quinacridone solid solution pigment can be more advantageously prevented from being dissolved in the liquid medium. The whole amount of the liquid medium is not particularly limited, but is preferably an amount much larger than the crude quinacridone solid solution pigment, in terms of the weight, especially preferably in the range corresponding to the amount 5 to 10 times the weight of the crude quinacridone solid solution pigment.

This method can be conducted at a heating temperature in the range of 60 to 150° C., preferably in the range of 70 to 140° C. With respect to the heating time, there is no particular limitation, but, from the viewpoint of obtaining a pigment having a more uniform particle diameter, the heating time can be 2 to 10 hours. In this method, from the viewpoint of easily obtaining the quinacridone solid solution pigment of the invention, it is preferred that the heating step in two stages is performed. More specifically, it is preferred that heating is conducted at a lower temperature in the above-mentioned temperature range (for example, at 60 to 100° C.) for a time within the above-mentioned range of the heating time, and then heating is conducted at a higher temperature in the above-mentioned temperature range (for example, at a temperature higher than 100° C. to 140° C.) for a time within the above-mentioned range of the heating time.

In the heating step, sampling is preliminarily made per unit time under the fixed conditions for temperature and stirring, and crystal X-ray diffraction of the pigment is determined, and, in the actual production, the heating step is stopped at a time when the quinacridone solid solution pigment satisfies the construction of the invention (the above-mentioned "ratio of diffraction peak intensity" or "thickness of a crystallite"), making it possible to obtain a desired intended product.

In the invention, when a quinacridone pigment derivative is used, with respect to the method for adding the quinacridone pigment derivative, there is no particular limitation, but, upon adding the crude quinacridone solid solution pigment to the above-mentioned liquid medium, the quinacridone pigment derivative is further added, and then the heating step is conducted, so that a desired quinacridone pigment, can be obtained. Alternatively, the quinacridone pigment derivative can be added to an aqueous dispersion obtained after removing the water-soluble organic solvent from the liquid medium by distillation or the like. The amount of the quinacridone pigment derivative used is as mentioned above.

The thus obtained quinacridone solid solution pigment of the invention can be advantageously used in any applications that require a coloring function. For example, the quinacridone solid solution pigment can be used in conventionally known various types of applications commonly used, such as a coating composition, a printing ink, a colored molded article, a toner for electrostatic latent image development, a color filter for a liquid crystal display, and an aqueous ink for ink-jet recording.

Hereinbelow, the present invention will be described in more detail with reference to the following Examples and Comparative Example. In the following Examples and Comparative Example, "%" indicates "% by mass" unless otherwise specified.

Production Example 1

510 g of 85% phosphoric acid was weighed and placed in a 2 L separable flask, and 725 g of phosphoric acid anhydride was added thereto and the resultant mixture was stirred to prepare 84% polyphosphoric acid. After the temperature of the polyphosphoric acid had been lowered to about 100° C., 255 g of 2,5-dianilinoterephthalic acid, which is a raw material for C. I. Pigment Violet 19, and 170 g of 2,5-di-toluidinoterephthalic acid, which is a raw material for C. I. Pigment Red 122, were successively slowly added to the polyphosphoric acid, and, after the addition of the raw materials was completed, a condensation reaction was conducted at 125° C. for 3 hours. After completion of the reaction, 7 L of water at 30° C. was weighed and placed in a 10 L stainless steel cup and, while stirring the water, the resultant reaction mixture was poured into the water to obtain a solid solution crude pigment slurry of the C. I. Pigment Violet 19 and C. I. Pigment Red 122. The obtained solid solution slurry was subjected to filtration and washing with water to obtain 1,550 g of a solid solution crude pigment wet cake (solids content: 26.5%).

Production Example 2

510 g of 85% phosphoric acid was weighed and placed in a 2 L separable flask, and 725 g of phosphoric acid anhydride was added thereto and the resultant mixture was stirred to prepare 84% polyphosphoric acid. After the temperature of the polyphosphoric acid had been lowered to about 100° C., 212.5 g of 2,5-dianilinoterephthalic acid, which is a raw material for C. I. Figment Violet 19, and 212.5 g of 2,5-ditoluidinoterephthalic acid, which is a raw material for C. I. Pigment Red 122, were successively slowly added to the polyphosphoric acid, and, after the addition of the raw materials was completed, a condensation reaction was conducted at 125° C. for 3 hours. After completion of the reaction, 7 L of water at 30° C. was weighed and placed in a 10 L stainless steel cup and, while stirring the water, the resultant reaction mixture was poured into the water to obtain a solid solution crude pigment slurry of the C. I. Pigment Violet 19 and C. I. Pigment. Red 122. The obtained solid solution slurry was subjected to filtration and washing with water to obtain 1,560 g of a solid solution crude pigment wet cake (solids content: 26.3%).

Production Example 3

510 g of 85% phosphoric acid was weighed and placed in a 2 L separable flask, and 725 g of phosphoric acid anhydride was added thereto and the resultant mixture was stirred to prepare 84% polyphosphoric acid. After the temperature of the polyphosphoric acid had been lowered to about 100° C., 297.5 g of 2,5-dianilinoterephthalic acid, which is a raw material for C. I. Pigment Violet 19, and 127.5 g of 2,5-ditoluidinoterephthalic acid, which is a raw material for C. I. Pigment Red 122, were successively slowly added to the polyphosphoric acid, and, after the addition of the raw materials was completed, a condensation reaction was conducted at 125° C. for 3 hours. After completion of the reaction, 7 L of water at 30° C. was weighed and placed in a 10 L stainless steel cup and, while stirring the water, the resultant reaction mixture was poured into the water to obtain a solid solution crude pigment slurry of the C. I. Pigment Violet 19 and C. I. Pigment Red 122. The obtained solid solution slurry was subjected to filtration and washing with water to obtain 1,540 g of a solid solution crude pigment wet cake (solids content: 26.6%).

Example 1

2,264 g of the solid solution crude pigment wet cake obtained in Production Example 1, 1,940 g of isobutanol, and 2,350 g of water were charged into a closed vessel having an internal volume of 10 L, and the resultant mixture was subjected to heat treatment at 40° C. for 3 hours and further at 140° C. for 3 hours while stirring, and then isobutanol was recovered from the system by distillation to obtain a solid solution pigment slurry. The obtained solid solution pigment slurry was subjected to filtration and washing with water, and then dried at 98° C. for 18 hours, and further pulverized to obtain 573 g of a solid solution pigment of the C. I. Pigment Violet 19 and C. I. Pigment Red 122. With respect to the obtained solid solution pigment, the XRD diffraction peak intensity ratio was 0.97, and the thickness of a crystallite was 26.1 nm.

Example 2

189 g of the solid solution crude pigment wet cake obtained in Production Example 1, 162 g of isobutanol, and 190 g of water were charged into a closed vessel having an internal volume of 1 L, and the resultant mixture was subjected to heat treatment at 40° C. for 3 hours and further at 140° C. for 3 hours while stirring, and then isobutanol was recovered from the system by distillation to obtain a solid solution pigment slurry. The obtained solid solution pigment slurry was subjected to filtration and washing with water, and then dried at 98° C. for 18 hours, and further pulverized to obtain 47.5 g of a solid solution pigment of the C. I. Pigment Violet 19 and C. I. Pigment Red 122. With respect to the obtained solid solution pigment, the XRD diffraction peak intensity ratio was 1.06, and the thickness of a crystallite was 26.1 nm.

Example 3

189 g of the solid solution crude pigment wet cake obtained in Production Example 1, 162 g of isobutanol, and 190 g of water were charged into a closed vessel having an internal volume of 1 L, and the resultant mixture was subjected to heat treatment, at 140° C. for 5 hours while stirring, and then isobutanol was recovered from the system by distillation to obtain a solid solution pigment slurry. The obtained solid solution pigment slurry was subjected to filtration and washing with water, and then dried at 98° C. for 18 hours, and further pulverized to obtain 44.5 g of a solid solution pigment of the C. I. Pigment Violet 19 and C. I. Pigment Red 122. With respect to the obtained solid solution pigment, the XRD diffraction peak intensity ratio was 1.01, and the thickness of a crystallite was 22.3 nm.

Example 4

2,190 g of the solid solution crude pigment wet cake obtained in Production Example 1, 1,940 g of isobutanol, and 2,350 g of water were charged into a closed vessel having an internal volume of 10 L, and the resultant mixture was subjected to heat treatment at 80° C. for 3 hours and further at 135° C. for 2 hours while stirring, and then isobutanol was recovered from the system by distillation to obtain a solid solution pigment slurry. The obtained solid solution pigment slurry was subjected to filtration and washing with water, and then dried at 98° C. for 18 hours, and further pulverized to obtain 570 g of a solid solution pigment of the C. I. Pigment Violet 19 and C. I. Pigment Red 122. With respect to the obtained solid solution pigment, the XRD diffraction peak intensity ratio was 0.99, and the thickness of a crystallite was 31.3 nm.

Example 5

135 g of the solid solution crude pigment wet cake obtained in Production Example 1, 129 g of isobutanol, and 168 g of water were charged into a closed vessel having an internal volume of 1 L, and the resultant mixture was subjected to heat treatment at 130° C. for 5 hours while stirring, and then isobutanol was recovered from the system by distillation to obtain a solid solution pigment slurry. 0.2 g of aluminum dichloroquinacridonesulfonate was added to the obtained solid solution pigment slurry, and the resultant mixture was stirred at 60° C. for 30 minutes, and then subjected to filtration and washing with water, and then dried at 98° C. for 18 hours, and further pulverized to obtain 36.9 g of a solid solution pigment of the C. I. Pigment Violet 19 and C. I. Pigment Red 122. With respect, to the obtained solid solution pigment, the XRD diffraction peak intensity ratio was 0.97, and the thickness of a crystallite was 26.1 nm.

Example 6

188 g of the solid solution crude pigment wet cake obtained in Production Example 3, 162 g of isobutanol, and 192 g of water were charged into a closed vessel having an internal volume of 1 L, and the resultant mixture was subjected to heat treatment, at 40° C. for 3 hours and further at 140° C. for 3 hours while stirring, and then isobutanol was recovered from the system by distillation to obtain a solid solution pigment slurry. The obtained solid solution pigment slurry was subjected to filtration and washing with water, and then dried at 98° C. for 18 hours, and further pulverized to obtain 43.9 g of a solid solution pigment of the C. I. Pigment Violet 19 and C. I. Pigment Red 122. With respect to the obtained solid solution pigment, the XRD diffraction peak intensity ratio was 0.63, and the thickness of a crystallite was 13.2 nm.

Comparative Example 1

190 g of the solid solution crude pigment wet cake obtained in Production Example 2, 162 g of isobutanol, and 190 g of water were charged into a closed vessel having an internal volume of 1 L, and the resultant mixture was subjected to heat treatment at 100° C. for 5 hours while stirring, and then isobutanol was recovered from the system by distillation to obtain a solid solution pigment slurry. The obtained solid solution pigment slurry was subjected to filtration and washing with water, and then dried at 98° C. for 18 hours, and further pulverized to obtain 43.5 g of a solid solution pigment of the C. I. Pigment Violet 19 and C. I. Pigment Red 122. With respect to the obtained solid solution pigment, the XRD diffraction peak intensity ratio was 1.31, and the thickness of a crystallite was 19.5 nm.
[Method for Measuring the Peak Intensity Ratio and the Thickness of a Crystallite by X-Ray Diffractometry]

Using a powder X-ray diffraction apparatus (X' Pert PRO MPD, manufactured by PANalytical) which uses a Cu Kα ray as a source of an X-ray, the measurement was conducted under conditions such that the tube current was 40 mA, the voltage was set at 45 kV, and the scanning range (2θ) was 4 to 35°.

The intensity ratio was defined by the following formula.

Intensity ratio "-"=(Diffraction peak intensity at a diffraction angle 2θ of around 11.9°)/(Diffraction peak intensity at a diffraction angle 2θ of around 14.8°)

The thickness of a crystallite was determined by making a calculation from the maximum peak at a diffraction angle 2θ in the range of 13 to 14° by a half band width method according to the Scherrer's equation using a Scherrer constant of 0.9.
[Method for Evaluating Hue]

The prepared ink for evaluation was monochrome-printed on plain paper using a printer for printing test to prepare a color sample. With respect to the solid printed portion of the color sample, color measurement was conducted by means of exact, manufactured by X-Rite Inc. The criteria used for the evaluation are as shown below. The larger (or the closer to zero) the b*value, the more yellowish or excellent the hue.
  ◎: b*≥−5.0
  X: b*<−5.0
[Method for Evaluating Storage Stability]

The prepared ink for evaluation was sealed in a glass container, such as a screw-thread vial, and subjected to heating test in a thermostatic chamber at 70° C. for 2 weeks, and, before and after the heating test, a viscosity of the ink was individually measured and a change of the viscosities was observed to evaluate the stability of the ink for evaluation. In the measurement, TV-35, manufactured by Toki Sangyo Co. Ltd., was used, and the ink was preheated and stirred at 20° C. and at 30.0 rpm for one minute, and then the measurement was conducted under conditions for stirring at 20° C. and at 30.0 rpm for one minute. The storage stability was defined by the following formula.

Storage stability [%]=[Viscosity [mPa·s] of the ink for evaluation after heated for 2 weeks)/(Viscosity [mPa·s] of the ink for evaluation immediately after prepared)]×100

The criteria used for the evaluation are as shown below. The smaller the value of storage stability (%), the smaller the change with time, or the more excellent the storage stability.
  ⊙: 300
  ○: 300 to 500
  X: >500
[Results of the Measurement of the Peak Intensity Ratio, He, and Storage Stability of the Quinacridone Ink Composition]

TABLE 1

|  | Intensity ratio | Thickness of crystallite (nm) | Hue (b* value) | Storage stability (%) |
|---|---|---|---|---|
| Example 1 | 0.97 | 26.1 | −4.2 (○) | 179 (⊙) |
| Example 2 | 1.06 | 26.1 | −4.7 (○) | 291 (⊙) |
| Example 3 | 1.01 | 22.3 | −4.8 (○) | 289 (⊙) |
| Example 4 | 0.99 | 31.3 | −4.6 (○) | 204 (⊙) |
| Example 5 | 0.97 | 26.1 | −5.0 (○) | 85 (⊙) |
| Example 6 | 0.68 | 13.2 | −2.8 (○) | 500 (○) |
| Comparative Example 1 | 1.31 | 19.5 | −5.7 (X) | (X) |

In Examples 1 to 6, the b* value is as large as −5.0 or more and the hue is yellowish, and further the storage stability is 500% or less, and thus excellent results are obtained, as compared to those in Comparative Example 1. The reason for this is presumed to reside in that the intensity ratio is as small as 1.20 or less, and thus the ratio of the C. I. Pigment Violet 19 and C. I. Pigment Red 122 forming the solid solution is in the range that is effective in making uniform the size and shape of the crystallite. Particularly, in Examples 1 to 5, excellent results are obtained such that the value or storage stability is extremely small. The reason for this is presumed to reside in that the intensity ratio is as small as 1.20 or less, and further the thickness of a crystallite is 20 to 40 nm, and thus the dispersion stability in the ink is excellent not due to the uniform size and shape of the crystallite, but due to the size of the crystallite which is larger than that in Comparative Example 1, so that excellent storage stability is exhibited.

The invention claimed is:

1. A quinacridone solid solution pigment comprising a quinacridone solid solution which consists of C. I. Pigment Violet 19 and C. I. Pigment Red 122,
wherein the quinacridone solid solution pigment has a diffraction peak intensity at a diffraction angle 2θ of 14.8±0.2° and a diffraction peak intensity at a diffraction angle 2θ of 11.9±0.2° as measured by X-ray diffractometry with respect to the quinacridone solid solution, and
wherein the ratio of the diffraction peak intensity at the diffraction angle 2θ of 14.8±0.2° to the diffraction peak intensity at the diffraction angle 2θ of 11.9±0.2° is 1.20 or less, as measured by X-ray diffractometry with respect to the quinacridone solid solution.

2. The quinacridone solid solution pigment according to claim 1, wherein the thickness of a crystallite is from 20 to 40 nm, as determined by X-ray diffractometry from a half band width of the maximum peak appearing at a diffraction angle 2θ of 13 to 14°.

3. A quinacridone pigment having the quinacridone solid solution pigment according to claim 1, which further comprises a quinacridone pigment derivative.

4. The quinacridone pigment according to claim 3, wherein the amount of the quinacridone pigment derivative contained is from 1 to 10 parts by mass, relative to 100 parts by mass of the quinacridone solid solution pigment.

5. An ink composition comprising at least the quinacridone solid solution pigment according to claim 1, and a quinacridone pigment derivative.

6. The ink composition according to claim 5, which comprises from 1 to 10 parts by mass of the quinacridone pigment derivative, relative to 100 parts by mass of the quinacridone solid solution pigment.

7. The quinacridone solid solution pigment according to claim 1, wherein the ratio of the diffraction peak intensity at the diffraction angle 2θ of 14.8±0.2° to the diffraction peak intensity at the diffraction angle 2θ of 11.9±0.2° is at least 0.68.

\* \* \* \* \*